United States Patent [19]
Kim et al.

[11] Patent Number: 5,745,731
[45] Date of Patent: Apr. 28, 1998

[54] DUAL CHANNEL FIFO CIRCUIT WITH A SINGLE PORTED SRAM

[75] Inventors: Min Hwahn Kim; Dong Woo Shin, both of Ichonkun, Rep. of Korea

[73] Assignee: Hyundai Electronics Industries Co., Ltd., Kyoungkido, Rep. of Korea

[21] Appl. No.: 621,061

[22] Filed: Mar. 22, 1996

[30]  Foreign Application Priority Data

Mar. 23, 1995 [KR] Rep. of Korea ............... 1995-6195

[51] Int. Cl.⁶ ................................... G06F 13/00
[52] U.S. Cl. ................... 395/476; 395/431; 395/877
[58] Field of Search ..................... 365/189.02, 221, 365/230.05; 395/436, 431, 476, 872–877

[56] References Cited

U.S. PATENT DOCUMENTS

| | | | |
|---|---|---|---|
| 4,899,352 | 2/1990 | Cucchi et al. | 375/372 |
| 4,949,301 | 8/1990 | Joshi et al. | 395/427 |
| 5,305,319 | 4/1994 | Sowell | 370/463 |
| 5,343,435 | 8/1994 | Bourekas et al. | 365/221 |
| 5,495,451 | 2/1996 | Cho | 365/221 |
| 5,546,347 | 8/1996 | Ko et al. | 365/221 |
| 5,568,443 | 10/1996 | Dixon et al. | 365/230.05 |

*Primary Examiner*—Lance Leonard Barry
*Attorney, Agent, or Firm*—Spencer & Frank

[57]  ABSTRACT

In accordance with the present invention, there is provided a dual channel FIFO circuit to perform bidirectional data transfer under the control of a host computer between a host interface and a small computer system interface, comprising: a first multiplexing means for selecting one of the data from said host interface and the data from said small computer system interface; a single ported SRAM for storing the selected data by said first multiplexing means and outputting the data, which are indicated by pointers, according to the requests from said host interface or said small computer system interface; a second multiplexing means for selecting one of the data from said single ported SRAM and the data from said small computer system interface; a first staging memory means for storing the data to be outputted to said host interface; and a second staging memory means for storing the selected data by said second multiplexing means and transferring them to said second multiplexing means and said small computer system interface.

7 Claims, 1 Drawing Sheet

DUAL CHANNEL FIFO CIRCUIT WITH A SINGLE PORTED SRAM

BACKGROUND OF THE INVENTION

1. Field of the Invention

The present, invention relates to a dual channel first-in first-out (FIFO) circuit capable of increasing the transfer rate between a host computer and a small computer system interface (SCSI), using a single ported synchronous SRAM, multiplexers and registers.

2. Description of the Prior Art

In general, it is a well-known practice to employ flip-flops or a dual ported SRAM as a FIFO circuit between the host computer and the SCSI. However, in case where the FIFO circuit is composed of flip-flops, a large area of a silicon substrate is desired because of the size of the flip-flops. Also, in case of a dual ported SRAM, a designer must design a complex architecture of the SRAM.

SUMMARY OF THE INVENTION

An object of the present invention is to provide a dual channel FIFO circuit having the capability of increasing the transfer rate between a host computer and a small computer system interface (SCSI), using a single ported synchronous SRAM and registers.

Another object of the present invention is to provide a dual channel FIFO circuit which prevents data collisions, using a single ported synchronous SRAM and registers.

In accordance with an aspect of the present invention, there is provided a dual channel FIFO circuit to perform bidirectional data transfer under the control of a host computer between a host interface and a small computer system interface, comprising: a first multiplexing means for selecting one of the data from said host interface and the data from said small computer system interface; a single ported SRAM for storing the selected data by said first multiplexing means and outputting the data, which are indicated by pointers, according to the requests from said host interface or said small computer system interface; a second multiplexing means for selecting one of the data from said single ported SRAM and the data from said small computer system interface; a first staging memory means for storing the data to be outputted to said host interface; and a second staging memory means for storing the selected data by said second multiplexing means and transferring them to said second multiplexing means and said small computer system interface.

BRIEF DESCRIPTION OF THE DRAWINGS

Other objects and aspects of the invention will become apparent from the following description of embodiments with reference to the accompanying drawings, in which.

DETAILED DESCRIPTION OF THE PREFERRED EMBODIMENT

Figure 1:
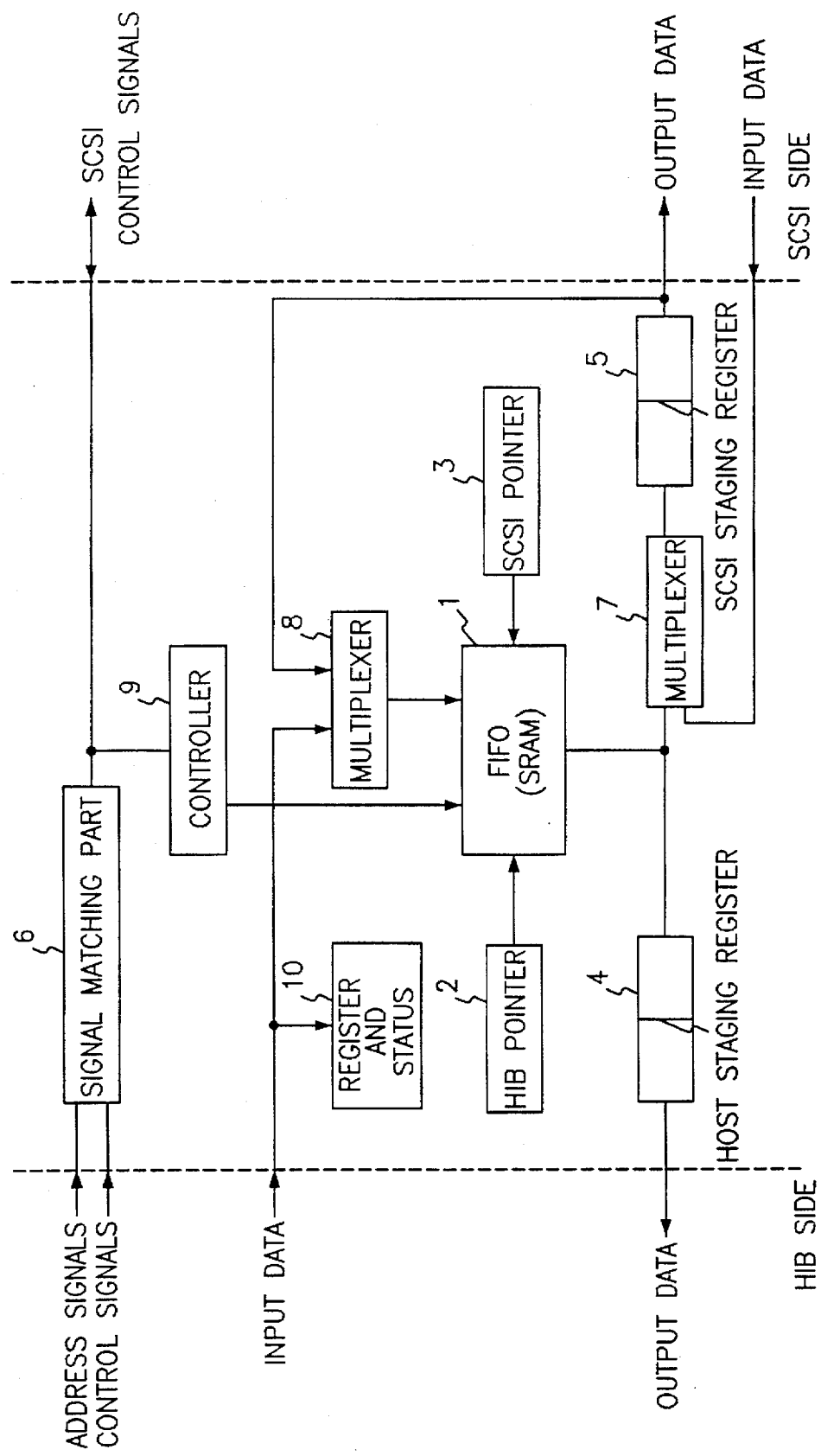
FIG. 1 is a block diagram illustrating a dual channel FIFO circuit according to the present invention.

Hereinafter, a dual channel FIFO circuit according to the present invention will be described below in detail, referring to FIG. 1.

First, since the maximum transfer rate of the FIFO is dependent upon the speed of the input clock signal, it falls under control of the host interface manners. Therefore, there is provided a status register to control the state of the FIFO according to operation mode of the SCSI side at the time of interfacing with the SCSI. Also, each register is initialized at the time of initialization of the FIFO circuit. Furthermore, if a pointer is initialized, the contents of the pointer are also initialized and operates as a starting pointer when a new processing of the SCSI starts.

FIG. 1 is a block diagram illustrating a dual channel FIFO circuit according to the present invention. In FIG. 1, the reference numerals, 1, 2, 3, 4, 5, 6, 9 and 10 denote a FIFO, a HIB (Host Interface Block) pointer, a SCSI pointer, a host staging register, a SCSI staging register, a signal matching part, a FIFO controller and a register and status part, respectively. Also, the reference numerals 7 and 8 denote multiplexers. A host computer is in control of each blocks shown in FIG. 1

Referring to FIG. 1, the multiplexer 8 receives input data from the HIB side and input data inputted from the SCSI staging register 5 through the multiplexer 7, and selects one of the two input data.

The FIFO 1 consists of a single ported synchronous SRAM and is synchronized by a clock signal. The FIFO 1 receives the output of the multiplexer 8 and determines the direction of the outputted data under the control of the FIFO controller 9. The output data outputs to the HIS side through the HOST staging register 4. The multiplexer 7 selects one of the data stored in the FIFO 1 and the SCSI input data, and the selected data by the multiplexer 7 are inputted into the multiplexer 8 or the SCSI side through the host staging register 4.

In case where the HIB side connected industry standard architecture is used, the length of the input/output cycle of the host computer is fixed. Accordingly, the FIFO 1 may not be used for a the host access period time when the SCSI bus is operating. In this case, if there are no staging registers, the underrun of data transfer is generated because the FIFO 1 can not respond to requests. However, as in the present invention, provided there are staging registers, the underrun is not generated at the time of transferring the data, by responding to the request of the host after them are loaded to the staging registers.

The signal matching part 6 decodes address signals inputted from the host interface and processes the control signals from the HIB side.

The FIFO controller 9 receives the output from the signal matching part 6 and the control signal from the SCSI side, and controls the FIFO 1 and generates control signals to be outputted to the SCSI side.

The FIFO 1 can access all the HIB and SCSI buses and the FIFO 1 has two pointers 2 and 3 which become independent from each other. The HIB pointer 2 instructs the FIFO 1 to access data from the HIB side, and the SCSI pointer 3 instructs the same FIFO 1 to access data from the SCSI side.

When the sequence of the SCSI side starts, the values of these two pointers 2 and 3 indicate "0", and when the input/output operations are finished, the values of these two pointers indicate "empty" showing that there are not data in the FIFO 1.

The register and status part 10 indicates the state of each element and manages the channels of the FIFO 1.

The FIFO 1 can execute the concurrent dual channel FIFO access by means of reciprocal action between blocks including the FIFO controller 9 and the register and status part 10. Also, the transfer bandwidth can be determined dependently by the clock frequency of the FIFO 1. On the other hand, the maximum transfer bandwidth must be 20 MB/sec to satisfy the maximum transfer of SCSI-II, 10 MB/sec. In general, when the I/O commands of the SCSI side are executed, the FIFO 1 has data which are shorter than those to be transferred. Accordingly, when the FIFO 1 executes the SCSI commands, it must performs several fill and empty operations. In order to maintain a higher performance of the entire system, the FIFO 1 must concurrently execute the fill and empty operations. As stated above, in the present invention, these executions are achieved by the controls between blocks.

These operations will be described in detail.

At the time of executing the SCSI read command (data in phase), a channel to access the FIFO 1 is allocated to the SCSI side and the control block in the SCSI side controls the controller 9 to fill the FIFO 1 with data from the SCSI bus. At this time, another channel is allocated to the HIB side for the previous data stored in the FIFO 1 to empty into the memory therein.

In case of the SCSI write command (data out phase), the dual channel FIFO shown in FIG. 1 control processing sequences between the HIB and SCSI channels using a mediation scheme such as a fixed equal access manner, an equal priority manner, an equal allocation manner and a round robin manner in each channel. Also, when each channel accesses the FIFO 1, a fixed amount of time is allocated to it.

The staging register 4 compensates a timing difference in processing data between the HIB side and FIFO 1, and also the staging register 5 compensates a timing difference in processing data between the SCSI side and FIFO 1.

To obtain a fast synchronous SCSI transfer of 10 MB/sec, there is provided a state machine to control data transfer between the staging register 4 and the FIFO 1. This state machine is composed of a stand-alone state machine capable of automatically transferring data. If a direction to transfer data is determined, data in the FIFO 1 are automatically transferred to the staging resister 4. Also, the input data from the SCSI side are automatically transferred to the multiplexer 8 through the staging resister 5, as shown in FIG 1.

As apparent from the above description, the present invention has an effect on manufacture of a high performance device with a small area of the silicon substrate, by processing the FIFO's functions with a single ported synchronous SRAM at high speed.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A dual channel first-in first-out (FIFO) circuit to perform bidirectional data transfer under the control of a host computer between a host interface and a small computer system interface, comprising:

a first multiplexing means for selecting one of the data from said host interface and the data from said small computer system interface;

a single ported SRAM for storing the selected data by said first multiplexing means and outputting the data, which are indicated by pointers, according to the requests from said host interface or said small computer system interface;

a second multiplexing means for selecting one of the data from said single ported SRAM and the data from said small computer system interface;

a first staging memory means for storing the data to be outputted to said host interface; and a second staging memory means for storing the selected data by said second multiplexing means and transferring them to said second multiplexing means and said small computer system interface.

2. A dual channel first-in first-out (FIFO) circuit in accordance with claim 1, wherein said dual channel FIFO circuit further comprises a register and status part for managing channels between a host interface and a small computer system interface.

3. A dual channel first-in first-out (FIFO) circuit in accordance with claim 1, wherein said first staging memory means compensates a timing difference between said host interface and said single ported SRAM.

4. A dual channel first-in first-out (FIFO) circuit in accordance with claim 1, wherein said second staging memory means compensates a timing difference between said small computer system interface and said single ported SRAM.

5. A dual channel first-in first-out (FIFO) circuit in accordance with claim 1, wherein said single ported SRAM is a synchronous SRAM.

6. A dual channel first-in first-out (FIFO) circuit in accordance with claim 1, wherein said first staging memory means comprises a stand-alone state machine to automatically control a data transfer.

7. A dual channel first-in first-out (FIFO) circuit in accordance with claim 1, wherein said second staging memory means comprises a stand-alone state machine to automatically control a data transfer.

* * * * *